US009792293B2

(12) United States Patent
Cherian et al.

(10) Patent No.: US 9,792,293 B2
(45) Date of Patent: Oct. 17, 2017

(54) MANAGING SERVICE ACCESS THROUGH SOCIAL CONTEXT

(71) Applicant: International Business Machines Corporation, Armonk, NY (US)

(72) Inventors: Alex Cherian, Bangalore (IN); Sreekanth R. Iyer, Bangalore (IN); Nataraj Nagaratnam, Cary, NC (US); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/199,525

(22) Filed: Mar. 6, 2014

(65) Prior Publication Data
US 2015/0254269 A1 Sep. 10, 2015

(51) Int. Cl.
*G06F 17/30* (2006.01)
*G06Q 50/00* (2012.01)

(52) U.S. Cl.
CPC .. *G06F 17/30165* (2013.01); *G06F 17/30864* (2013.01); *G06F 17/30997* (2013.01); *G06Q 50/01* (2013.01)

(58) Field of Classification Search
CPC ............ G06F 17/3089; G06F 17/3097; G06F 17/30011; G06F 17/30035; G06F 17/30424; G06F 17/30386; G06F 17/30867; G06F 17/30545; G06F 17/30864; G06F 17/30283; G06F 17/30528; G06F 17/30165; G06F 17/30997; G06F 17/30731
See application file for complete search history.

(56) References Cited

U.S. PATENT DOCUMENTS

| 8,386,564 B2 | 2/2013 | Pennington |
| 8,484,700 B2 | 7/2013 | Hulten et al. |
| 2009/0070286 A1* | 3/2009 | Liss ............... G06Q 10/10 707/999.001 |
| 2009/0325602 A1* | 12/2009 | Higgins ............... H04W 4/02 455/456.2 |

(Continued)

FOREIGN PATENT DOCUMENTS

| CN | 101681459 A | 3/2010 |
| WO | 2012082919 A2 | 6/2012 |
| WO | 2013098483 A1 | 7/2013 |

OTHER PUBLICATIONS

Fong, Philip W.L., "Relationship-based access control: protection model and policy language", Proceeding CODASPY '11 Proceedings of the first ACM conference on Data and application security and privacy, 2011, <http://dl.acm.org/citation.cfm?id=1943539>.

(Continued)

*Primary Examiner* — Ashish K Thomas
*Assistant Examiner* — Rezwanul Mahmood
(74) *Attorney, Agent, or Firm* — Maeve Carpenter

(57) ABSTRACT

A tool for providing access control for an application. The tool registers, by one or more computer processors, an application. The tool determines, by one or more computer processors, a social platform receives an access request. The tool determines, by one or more computer processors, an access determination for the access request. The tool sends, by one or more computer processors, the access determination for the access request.

18 Claims, 4 Drawing Sheets

(56) References Cited

U.S. PATENT DOCUMENTS

| | | | | |
|---|---|---|---|---|
| 2011/0154445 A1* | 6/2011 | Schmidt-Karaca | G06Q 10/10 | 705/319 |
| 2011/0202430 A1* | 8/2011 | Narayanan | G06Q 10/10 | 705/27.1 |
| 2012/0005229 A1* | 1/2012 | Li | G06Q 10/06 | 707/769 |
| 2012/0192258 A1* | 7/2012 | Spencer | H04W 12/06 | 726/7 |
| 2012/0284108 A1* | 11/2012 | Fontana et al. | | 705/14.27 |
| 2013/0017806 A1* | 1/2013 | Sprigg | H04M 1/66 | 455/411 |
| 2013/0041653 A1* | 2/2013 | Tseng | G06Q 50/01 | 704/9 |
| 2013/0073387 A1* | 3/2013 | Heath | G06Q 50/01 | 705/14.53 |
| 2013/0073389 A1* | 3/2013 | Heath | G06Q 50/01 | 705/14.54 |
| 2013/0073400 A1* | 3/2013 | Heath | G06Q 30/02 | 705/14.73 |
| 2013/0073473 A1* | 3/2013 | Heath | G06Q 30/02 | 705/319 |
| 2013/0132861 A1* | 5/2013 | Kienzle | G06Q 10/10 | 715/753 |
| 2013/0159519 A1 | 6/2013 | Hochberg et al. | | |
| 2013/0173368 A1* | 7/2013 | Boutin | G06F 17/30283 | 707/736 |
| 2014/0017646 A1* | 1/2014 | Seitzberg, III | G09B 19/00 | 434/236 |
| 2014/0089775 A1* | 3/2014 | Worsley | G06F 17/30575 | 715/230 |
| 2014/0172892 A1* | 6/2014 | Schechter | G06F 17/30867 | 707/758 |
| 2014/0180913 A1* | 6/2014 | Narayanan | G06Q 10/10 | 707/770 |
| 2015/0019559 A1* | 1/2015 | Maquaire | G06F 17/30997 | 707/740 |
| 2015/0095352 A1* | 4/2015 | Lacey | G06F 17/30011 | 707/752 |
| 2015/0293997 A1* | 10/2015 | Smith | H04L 51/32 | 707/749 |
| 2016/0255091 A1* | 9/2016 | Evans | G06Q 50/01 | |
| 2017/0093939 A1* | 3/2017 | Bar-Mashiah | H04L 65/4069 | |

OTHER PUBLICATIONS

Moo Nam Ko et al., "Social-Networks Connect Services", IEEE, pp. 37-43, Aug. 2010, <http://www.profsandhu.com/journals/computer/computer1008.pdf>.

"Oracle Mobile and Social Access Management", An Oracle White Paper, May 2013, http://www.oracle.com/technetwork/middleware/id-mgmt/overview/mobileandsocialaccessmanagementwp-1703656.pdf>.

* cited by examiner

MANAGING SERVICE ACCESS THROUGH SOCIAL CONTEXT

FIELD OF THE INVENTION

The present invention relates generally to communications systems, and more particularly to managing access through social context.

BACKGROUND OF THE INVENTION

Technological advancements in mobile computing and social networking impact the way business processes are implemented. Clients are looking for innovative ways to accelerate their business models, and they are looking to mobile devices and social tools to reach their consumers and employees. Market shifts around mobile devices and social tools have changed what clients expect to do using mobile devices, and as such, clients are increasingly shifting towards social tools to communicate and collaborate.

In the collaborative nature of business there is often more than one stakeholder to any service; a matrix of organizations and individuals that collectively lead to the success of a service. In this context, approval of a request for access may not be limited to one person, but rather a set of individuals. For example, a client is building a marketing mobile application and they would like access to use a shared client-notification service. The client would likely need approval from the owner of the shared client-notification service, as well as the owner of the marketing mobile application. Mobile computing and social networking impact the way business processes are implemented, how individuals participate in those processes, and how those individuals communicate with one another.

SUMMARY

Aspects of an embodiment of the present invention disclose a method, system, and computer program product for providing access control for an application. The method includes registering, by one or more computer processors, an application. The method includes determining, by one or more computer processors, a social platform receives an access request. The method includes determining, by one or more computer processors, an access determination for the access request. The method includes sending, by one or more computer processors, the access determination for the access request.

BRIEF DESCRIPTION OF THE SEVERAL DRAWINGS

DETAILED DESCRIPTION

Figure 1:
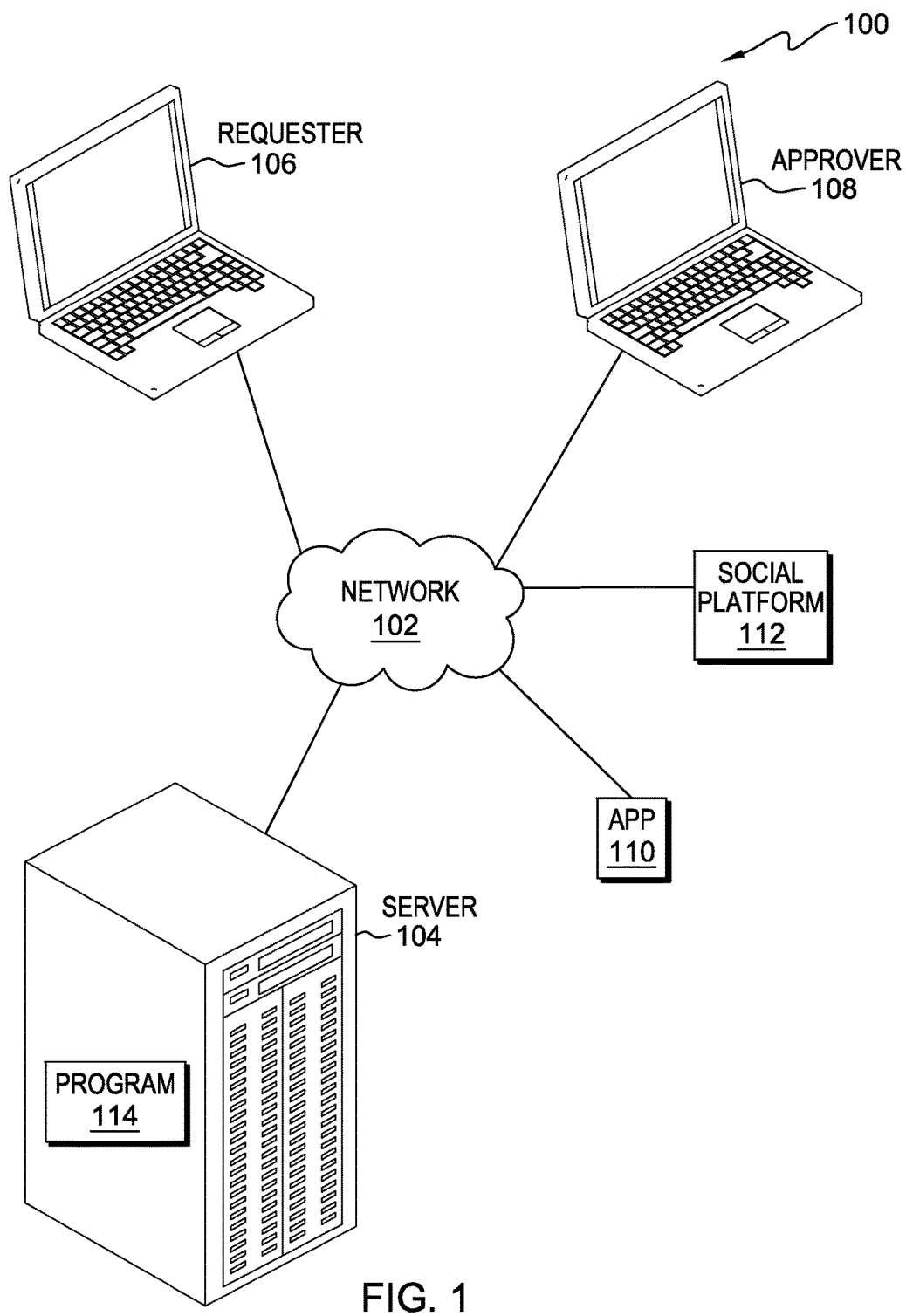
FIG. 1 is a functional block diagram illustrating a data processing environment, generally designated 100, in accordance with an embodiment of the present invention.

Embodiments of the present invention recognize that current access management systems do not leverage social tools and platforms to govern access to an application, or consider a person's social reputation in determining whether to provide access to an application.

Embodiments of the present invention provide the capability to leverage social tools and platforms to govern access to an application, and to consider real-time social context and social reputation in determining whether to provide access to an application.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to Figures. FIG. 1 illustrates a data processing environment, generally designated 100, according to an exemplary embodiment of the present invention. Data processing environment 100 comprises network 102, server 104, multiple client computers such as requester 106 and approver 108, app 110, and social platform 112.

In the exemplary embodiment, network 102 may include wire cables, wireless communication links, fiber optic cables, routers, switches and/or firewalls. Server 104, requester 106, and approver 108 are interconnected by network 102. In the exemplary embodiment, network 102 is the Internet representing a worldwide collection of networks and gateways that use TCP/IP protocols to communicate with one another. Network 102 may be implemented as a number of different types of networks, such as an intranet, a local area network (LAN), or a wide area network (WAN). FIG. 1 is intended as an example, and not as an architectural limitation for the different embodiments.

In the exemplary embodiment, server 104 may be, for example, a server computer system such as a management server, a web server, or any other electronic device or computing system capable of sending and receiving data. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications.

Server 104 executes program 114 for managing access control for an application, such as app 110, by leveraging social tools, social reputation, and social context to authenticate a requester, such as requester 106. Server 104, requester 106, and approver 108 each maintain respective internal components and respective external components. In general, server 104, requester 106, and approver 108 can be any programmable electronic device, as described in further detail with respect to FIG. 4.

In the exemplary embodiment, requester 106 and approver 108 are clients to server 104, and may be, for example, notebook computers, laptop computers, tablet computers, smart phones, thin clients, or any other electronic devices or computing systems capable of communicating with server 104 through network 102. In one embodiment, requester 106 may be a requester desiring access to an application, such as app 110, which the requester would like to execute on requester 106.

In the exemplary embodiment, app 110 is an application, such as a mobile application, a web application, or any other application capable of communicating with requester 106, approver 108, and program 114 of server 104 via network 102. App 110 may operate on server 104, requester 106, and approver 108. For example, app 110 may reside on server 104, be downloaded and executed on requester 106, and managed by approver 108 through program 114.

In the exemplary embodiment, social platform 112 includes social reputation, such as social networks, memberships or affiliations to groups, social profiles, social relationships, social metadata, and any other social details available through a plurality of social platforms via network 102. For example, social platform 112 may be a database where a requester's profiles, memberships, metadata, etc. are stored. In another example, social platform 112 may be a social network or other application that provides real time social reputation, such as reviews, photos, tags, locations, group affiliations, commentary, etc. In the exemplary embodiment, social platform 112 is accessible to server 104, requester 106, and approver 108 through network 102.

In the exemplary embodiment, program 114 includes a plurality of programs and functions to provide access control for an application by leveraging social platforms (e.g., Twitter®, Facebook®, LinkedIn®, YouTube®, Google+®, etc.), social reputation, and social context to authenticate a requester, such as requester 106, and govern access to an application, such as app 110, the requester is interested in, or would like to use.

Data processing environment 100 may include additional server computers, client computers, displays, and other devices not shown.

Figure 2:
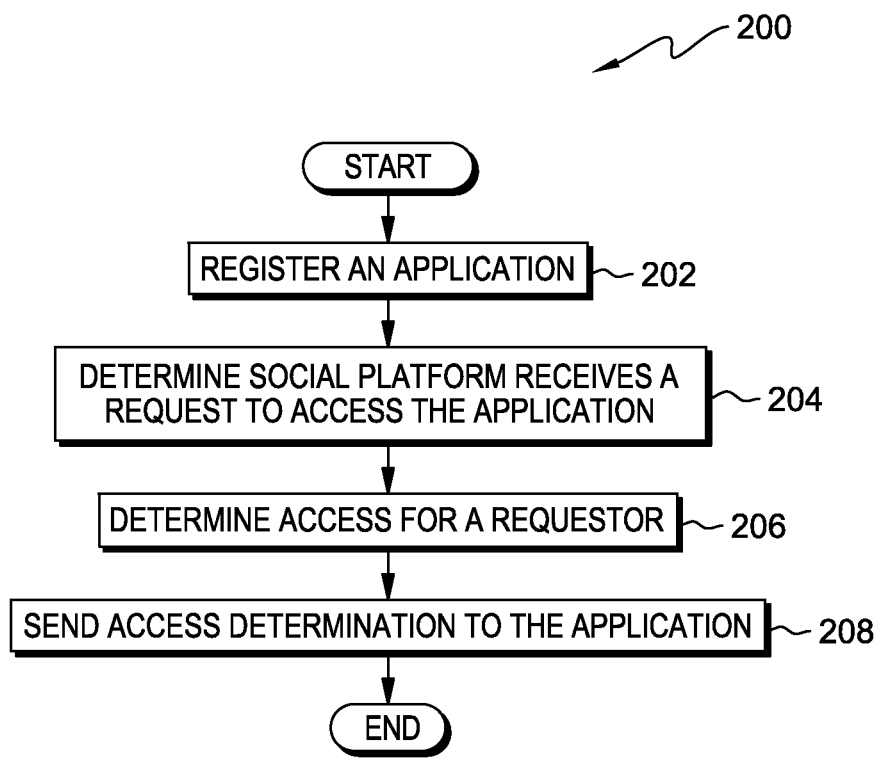
FIG. 2 is a flowchart of an exemplary process flow, generally designated 200, for managing access control for an application, in accordance with an embodiment of the present invention.

FIG. 2 is a flowchart depicting the steps of program 114 for providing access control for an application, in accordance with an embodiment of the present invention.

In response to receiving a request from an application owner to register an application, program 114 registers the application (step 202). In the exemplary embodiment, program 114 registers an application by assigning an application ID and determining designated approvers, social channels, application policies, and application preferences, as configured by the application owner. For example, a user, such as @somebody, owns a web application, such as webapp1, and wishes to utilize the capabilities provided by program 114. The web application owner submits a request to program 114 to register the application, and upon receipt of the request, program 114 assigns an application ID, such as @webapp1, and determines designated approvers (i.e., the web application owner, web application administrators, program 114, or any other user capable of making approval decisions regarding access to the application, as pre-determined by the web application owner), social channels (e.g., Twitter®, Facebook®, LinkedIn®, YouTube®, Google+®, etc.), application policies (i.e., a plurality of rules based on social reputation, social context, and real time analysis of social meta data that govern how access may be determined), and application preferences (e.g., providing a method for allowing hash tags and other mechanisms to allow conditional or temporary access approval, or providing a method for delegation of approver roles), as configured by the web application owner.

Program 114 monitors one or more social platforms for a request to access the application (step 204). In the exemplary embodiment, program 114 monitors one or more designated social platforms by periodically checking the one or more designated social platforms for a requester to submit an access request. For example, program 114 may monitor a Twitter® feed, such as #program 114, for a requester, such as @requester, to post a tweet (i.e., the access request) requesting access to the application @webapp1, such as "Request access @webapp1 #program 114." Program 114 periodically checks the feed, for example every 15 minutes, for newly submitted access requests.

In response to a requester submitting an access request, program 114 determines access for a requester (step 206). In the exemplary embodiment, program 114 determines access for the requester by monitoring one or more designated social platforms to determine whether one or more designated approvers has approved access for the requester. For example, a requester, such as @sreek, requests access to a web application, such as webapp1, through a social platform, such as Twitter®. The user may submit an access request by posting a tweet, such as, "Request access @webapp1," requesting access to the web application. An approver, such as @approver, monitors the postings to @webapp1, and in response to the access request being posted, the approver determines whether to approve access for the requester. Once the approver determines whether to approve access for the requester, the approver posts the access determination on the designated social platform. Program 114 continuously monitors the designated social platform for the approver's access determination, and in response to the approver providing the access determination, program 114 determines if the approver approved access for the requester.

In the exemplary embodiment, the approver determines whether to grant access to the requester by utilizing social reputation, social context, and real time analysis of social metadata to make an informed determination regarding access. For example, program 114 may specify the requester's social reputation as a designated policy, where the approver may use social reputation to make an informed determination regarding access based on the examination of social reputation details and relationships of the requester. The approver may grant access to the application only if five or more people in the approver's social network approve the request. In another example, the approver may use social context to make an informed determination regarding access based on the examination of social context relating to the requester and the application. For instance, based on the requester's membership to a specific social group, such as ABC College, the approver may grant access to webapp1, an application for alumni of ABC College. Similarly, if the requester has been recently tagged in a photo or a recent post relating to a marathon or a wedding, then the approver may grant access to the application for marathon statistics or photo sharing. In another example, the approver may use real time analysis of social metadata to make an informed determination regarding access. Program 114 may designate preferences to monitor social channels for a response from the approver during a specific time period, such as monitor Twitter® for 30 minutes after a request for access has been posted, or monitor only the most recent 20 tweets from the approver. For example, if the approver does not post an approval for the requester in the most recent 20 tweets, then program 114 determines that access is denied.

In another embodiment, program 114, functioning as a designated approver, may determine whether to grant access to the requester by utilizing social reputation, social context, and real time analysis of social metadata to make an informed determination regarding access. Program 114 may use social reputation, social context, and real analysis of social metadata to make an informed determination regarding access based on the examination of social reputation details and relationships of the requester, social context relating to the requester, and real time analysis of social metadata relating to the requester.

In another embodiment, program 114 may provide social reputation, social context, and real time analysis of social metadata to a designated approver for use in determining whether to grant access for a requester. Program 114 may provide information to an approver to aid in making an access determination, and then wait for a response from the approver, where the response grants or denies access for the requester. Program 114 may determine whether to grant access for the requester based, at least in part, on the response received from the approver.

Program 114 sends an access determination for the requester to the application (step 208). In the exemplary embodiment, program 114, in response to determining access for a requester, sends the access determination to the application, the application owner, or any designated user responsible for access control through a website service, a mobile application, or any other suitable user interface. Once program 114 sends the access determination to the application, the application owner, or any designated user responsible for access control with respect to the application, the application follows the access determination, allowing requester access to the application, or blocking requester access to the application.

Figure 3:
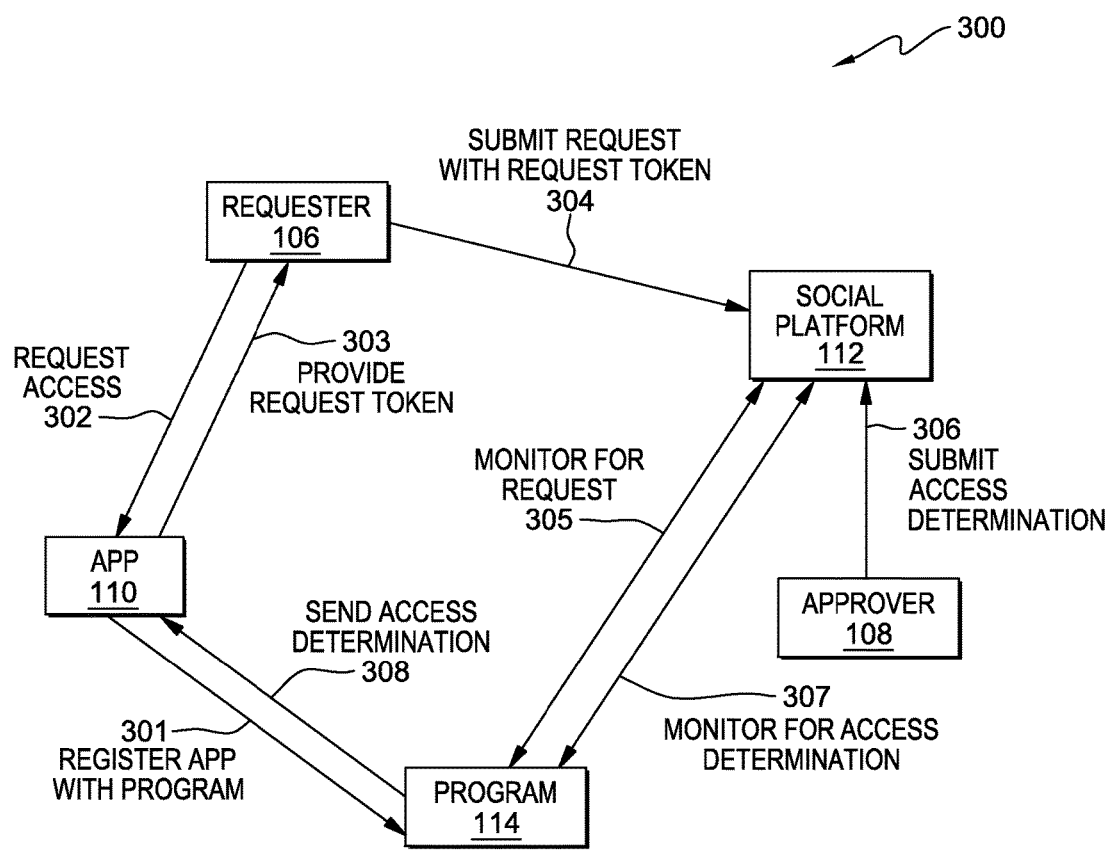
FIG. 3 is a functional block diagram depicting the steps of a program for providing access control for an application, in accordance with an embodiment of the present invention.

FIG. 3 is a functional block diagram depicting the steps of program 114 for providing access control for an application, in accordance with an embodiment of the present invention.

App 110 registers with program 114 (step 301). In the exemplary embodiment, app 110 registers with program 114 by requesting registration with program 114. In response to the registration request, program 114 registers app 110 by assigning an application ID and determining designated approvers, social channels, application policies, and application preferences, as configured by the application owner.

Requester 106 requests access to app 110 (step 302). In the exemplary embodiment, requester 106 may request access to app 110 by requesting to download the application. For example, requester 106 may search for the application on iTunes®, and request to download the application.

In response to requester 106 requesting access, app 110 provides a request token to requester 106 (step 303). In the exemplary embodiment, app 110 provides a request token (i.e., a unique app ID) to requester 106 for use in receiving an access determination from program 114. For example, app 110 may provide a unique app ID assigned by program 114 to requester 106 for use in receiving an access determination from program 114.

Requester 106 submits a request with the request token (step 304). In the exemplary embodiment, requester 106 submits a request, with the request token provided by app 100, for an access determination via social platform 112 by posting a request using the unique app ID (i.e., the request token) on a dedicated feed in social platform 112. For example, requester 106 may post a unique app ID, such as @webapp1, to a Twitter feed at #program 114.

Program 114 monitors social platform 112 for requests for an access determination (step 305). In the exemplary embodiment, program 114 periodically monitors social platform 112 for pending requests for an access determination for app 110. For example, program 114 may monitor social platform 112 every 10 minutes for pending requests for an access determination for app 110.

In response to a request for an access determination, approver 108 submits an access determination for requester 106 regarding app 110 (step 306). In the exemplary embodiment, approver 108 determines access for requester 106 regarding app 110 and submits the access determination via social platform 112. For example, approver 108 may approve access for requester 106 for app 110, and post the access determination, such as "Access granted for webapp1 @requester 106 #program 114.

Program 114 monitors social platform 112 for an access determination for requester 106 (step 307). In the exemplary embodiment, program 114 periodically monitors social platform 112 for an access determination for requester 106 for app 110 by applying rules and preferences set up for app 110 for determining access. For example, program 114 may monitor social platform 112 for 20 posts after the request for access determination was first submitted by requester 106. If approver 108 posts an approval for requester 106 within the first 20 posts placed to #program 114, program 114 will accept the access determination for requester 106.

Program 114 sends the access determination to app 110 (step 308). In the exemplary embodiment, program 114 sends the access determination to app 110 by any suitable electronic communication. For example, program 114 may send the access determination to app 110 through a program interface, electronic message, SMS message, etc.

Figure 4:
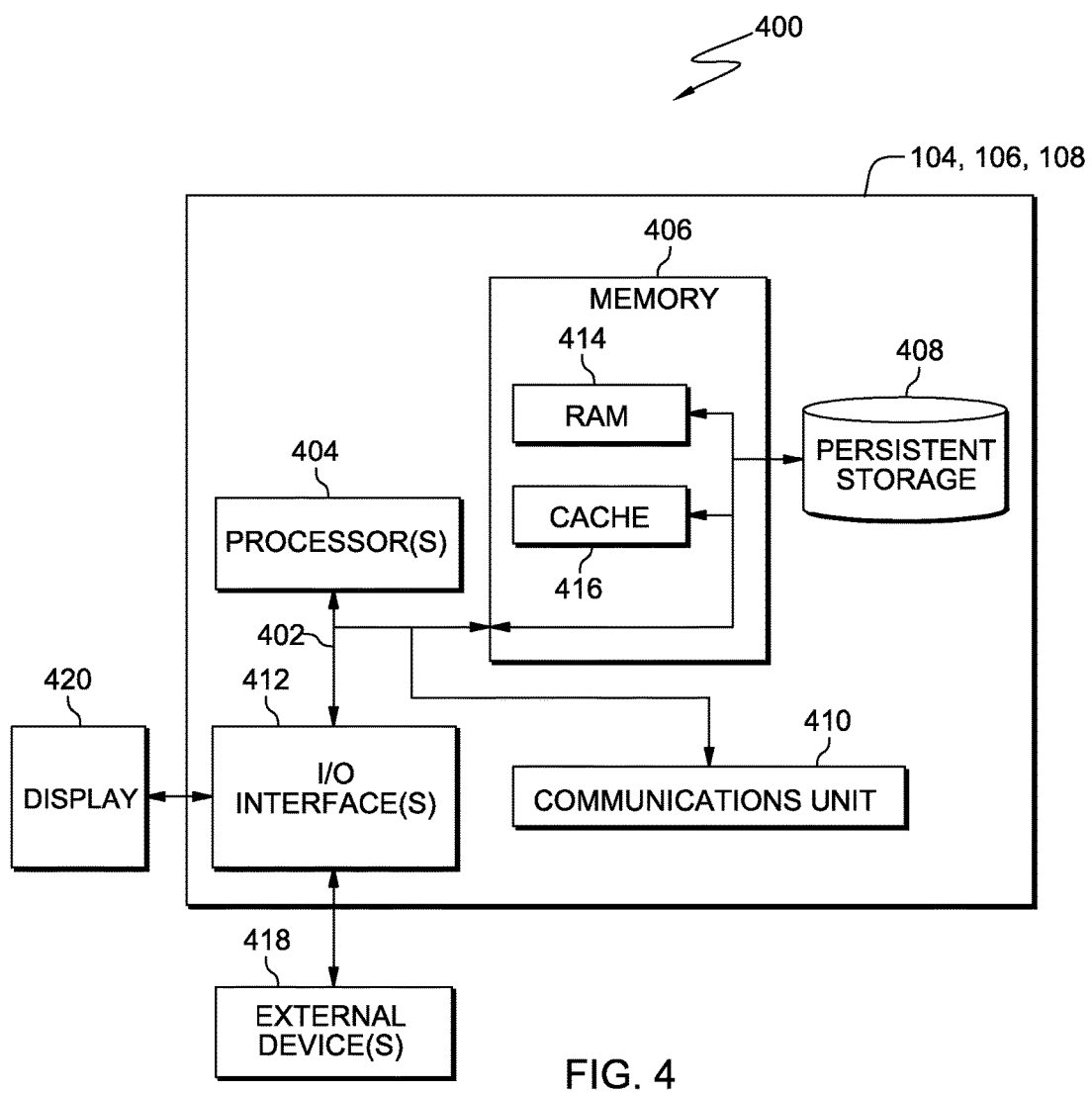
FIG. 4 is a block diagram depicting components of a data processing system (such as the server computer of FIG. 1), generally designated 400, in accordance with an embodiment of the present invention.

FIG. 4 depicts a block diagram of components of server 104, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 104 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Program 114 can be stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including requester 106 and approver 108. In these examples, communications unit 410 includes one or more network interface cards. Communications unit 410 may provide communications through the use of either or both physical and wireless communications links. Program 114 may be downloaded to persistent storage 408 through communications unit 410.

I/O interface(s) 412 allows for input and output of data with other devices that may be connected to server 104. For example, I/O interface(s) 412 may provide a connection to external device(s) 418 such as a keyboard, a keypad, a touch screen, and/or some other suitable input device. External device(s) 418 can also include portable computer-readable storage media such as, for example, thumb drives, portable optical or magnetic disks, and memory cards. Software and data used to practice embodiments of the present invention, e.g., program 114, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing access control for an application, the method comprising:
   registering, by one or more computer processors, an application;
   determining, by one or more computer processors, one or more social platforms receiving an access request for the application, wherein determining includes monitoring the one or more social platforms periodically for a requester to submit the access request for the application;
   determining, by one or more computer processors, an access determination for the access request, wherein determining an access determination includes providing information related to the requester's social reputation, social context, and real-time analysis of social metadata to two or more designated approvers for examination;
   monitoring, by one or more computer processors, the one or more social platforms for the access determination from the two or more designated approvers, wherein monitoring includes applying one or more preferences, wherein the one or more preferences include monitor the one or more social platforms for a response granting access from the two or more designated approvers within a pre-determined time period and a response granting access from each of one or more additional people in a social network of the two or more designated approvers; and
   responsive to a determination that the two or more designated approvers provided the response granting access within the pre-determined time period and each of the one or more additional people in the social network of the two or more designated approvers provided the response granting access, providing, by one or more computer processors, the response granting access as the access determination for the access request on the one or more social platforms, wherein providing the response granting access on the one or more social platforms allows for temporary access approval prior to a final approval decision by a designated owner of the application.

2. The method of claim 1, wherein registering an application, further comprises registering the application, based, at least in part, on receiving a request from an application owner to register the application.

3. The method of claim 1, wherein registering an application, further comprises:
   assigning a unique application ID;
   determining a designated approver list;
   determining a designated social platform;
   determining an application policy list; and
   determining an application preferences list.

4. The method of claim 1, wherein determining an access determination for the access request, further comprises leveraging the social platform to determine access, based, at least in part, on:
   social reputation of the requester within the requester's social network;
   social context of the requester's social network;
   social metadata related to the requester's social network; and
   a response from a designated approver.

5. The method of claim 4, wherein leveraging a social platform to determine access, further comprises applying an application policy list and an application preferences list to govern an access determination, based, at least in part, on:
   social reputation of the requester within the requester's social network;
   social context of the requester's social network;
   social metadata related to the requester's social network; and
   a response from a designated approver.

6. The method of claim 1, further comprising:
   sending, by one or more computer processors, an access determination for the access request to an application owner and a registered application.

7. A computer program product for providing access control for an application, the computer program product comprising:
one or more computer-readable storage media and program instructions stored on the one or more computer-readable storage media, the program instructions comprising:
program instructions to register, by one or more computer processors, an application;
program instructions to determine, by one or more computer processors, one or more social platforms receiving an access request for the application, wherein determining includes monitoring the one or more social platforms periodically for a requester to submit the access request for the application;
program instructions to determine, by one or more computer processors, an access determination for the access request, wherein determining an access determination includes providing information related to the requester's social reputation, social context, and real-time analysis of social metadata to two or more designated approvers for examination;
program instructions to monitor, by one or more computer processors, the one or more social platforms for the access determination from the two or more designated approvers, wherein monitoring includes applying one or more preferences, wherein the one or more preferences include monitor the one or more social platforms for a response granting access from the two or more designated approvers within a pre-determined time period and a response granting access from each of one or more additional people in a social network of the two or more designated approvers; and
responsive to a determination that the two or more designated approvers provided the response granting access within the pre-determined time period and each of the one or more additional people in the social network of the two or more designated approvers provided the response granting access, providing, by one or more computer processors, the response granting access as the access determination for the access request on the one or more social platforms, wherein providing the response granting access on the one or more social platforms allows for temporary access approval prior to a final approval decision by a designated owner of the application.

8. The computer program product of claim 7, wherein program instructions to register an application, further comprise program instructions to register the application, based, at least in part, on receiving a request from an application owner to register the application.

9. The computer program product of claim 7, wherein program instructions to register an application, further comprise:
program instructions to assign a unique application ID;
program instructions to determine a designated approver list;
program instructions to determine a designated social platform;
program instructions to determine an application policy list; and
program instructions to determine an application preferences list.

10. The computer program product of claim 7, wherein program instructions to determine an access determination for the access request, further comprise program instructions to leverage a social platform to determine access, based, at least in part, on one or more of:
social reputation of the requester within the requester's social network;
social context of the requester's social network;
social metadata related to the requester's social network; and
a response from a designated approver.

11. The computer program product of claim 10, wherein program instructions to leverage a social platform to determine access, further comprise program instructions to apply an application policy list and an application preferences list to govern an access determination, based, at least in part, on one or more of:
social reputation of the requester within the requester's social network;
social context of the requester's social network;
social metadata related to the requester's social network; and
a response from a designated approver.

12. The computer program product of claim 7, further comprising:
program instructions to send the access determination to an application owner and a registered application.

13. A computer system for providing access control for an application, the system comprising:
one or more computer processors;
one or more computer-readable storage media;
program instructions stored on at least one of the one or more computer-readable storage media for execution by at least one of the one or more computer processors, the program instructions comprising:
program instructions to register, by one or more computer processors, an application;
program instructions to determine, by one or more computer processors, one or more social platforms receiving an access request for the application, wherein determining includes monitoring the one or more social platforms periodically for a requester to submit the access request for the application;
program instructions to determine, by one or more computer processors, an access determination for the access request, wherein determining an access determination includes providing information related to the requester's social reputation, social context, and real-time analysis of social metadata to two or more designated approvers for examination;
program instructions to monitor, by one or more computer processors, the one or more social platforms for the access determination from the two or more designated approvers, wherein monitoring includes applying one or more preferences, wherein the one or more preferences include monitor the one or more social platforms for a response granting access from the two or more designated approvers within a pre-determined time period and a response granting access from each of one or more additional people in a social network of the two or more designated approvers; and
responsive to a determination that the two or more designated approvers provided the response granting access within the pre-determined time period and each of the one or more additional people in the social network of the two or more designated approvers provided the response granting access, providing, by one or more computer processors, the response granting access as the access determination for the access request on the one or more social platforms, wherein providing the response granting access on the one or more social platforms allows for temporary access approval prior to a final approval decision by a designated owner of the application.

14. The computer system of claim 13, wherein program instructions to register an application, further comprise program instructions to register the application, based, at least in part, on receiving a request from an application owner to register the application.

15. The computer system of claim 13, wherein program instructions to register an application, further comprise:
   program instructions to assign a unique application ID;
   program instructions to determine a designated approver list;
   program instructions to determine a designated social platform;
   program instructions to determine an application policy list; and
   program instructions to determine an application preferences list.

16. The computer system of claim 13, wherein program instructions to determine an access determination for the access request, further comprise program instructions to leverage a social platform to determine access, based, at least in part, on one or more of:
   social reputation of the requester within the requester's social network;
   social context of the requester's social network;
   social metadata related to the requester's social network; and
   a response from a designated approver.

17. The computer system of claim 16, wherein program instructions to leverage a social platform to determine access, further comprise program instructions to apply an application policy list and an application preferences list to govern an access determination, based, at least in part, on one or more of:
   social reputation of the requester within the requester's social network;
   social context of the requester's social network;
   social metadata related to the requester's social network; and
   a response from a designated approver.

18. The computer system of claim 13, further comprising:
   program instructions to send the access determination to an application owner and a registered application.

* * * * *